United States Patent
Yehudai

(10) Patent No.: US 7,796,708 B2
(45) Date of Patent: Sep. 14, 2010

(54) ADAPTIVE RECEIVER LOOPS WITH WEIGHTED DECISION-DIRECTED ERROR

(75) Inventor: Uri Yehudai, Bat-Yam (IL)

(73) Assignee: Provigent Ltd., Herzliya (IL)

( * ) Notice: Subject to any disclaimer, the term of this patent is extended or adjusted under 35 U.S.C. 154(b) by 213 days.

(21) Appl. No.: 11/394,172

(22) Filed: Mar. 29, 2006

(65) Prior Publication Data

US 2007/0230641 A1    Oct. 4, 2007

(51) Int. Cl.
*H04L 27/00* (2006.01)
(52) U.S. Cl. .......... 375/324; 375/152; 375/261; 375/284; 375/285; 375/294; 375/296; 375/326; 375/327; 375/329; 375/339; 375/143; 375/233; 375/235; 375/232
(58) Field of Classification Search ......... 375/143, 375/152, 261, 284, 285, 294, 296, 326, 327, 375/329, 339, 324, 233, 235, 232
See application file for complete search history.

(56) References Cited

U.S. PATENT DOCUMENTS

| | | | |
|---|---|---|---|
| 4,310,813 A | 1/1982 | Yuuki et al. |
| 4,321,705 A | 3/1982 | Namiki |
| 4,367,555 A | 1/1983 | Namiki et al. |
| 4,438,530 A | 3/1984 | Steinberger |
| 4,479,258 A | 10/1984 | Namiki |
| 4,575,862 A | 3/1986 | Tahara et al. |
| 4,577,330 A | 3/1986 | Kevehard |
| 4,606,054 A | 8/1986 | Amitay et al. |
| 4,631,734 A | 12/1986 | Foschini |
| 4,644,562 A | 2/1987 | Kavehrad et al. |
| 4,688,235 A | 8/1987 | Tahara et al. |
| 4,761,784 A | 8/1988 | Srinivasagopalan et al. |
| 4,857,858 A | 8/1989 | Tahara |
| 4,910,468 A | 3/1990 | Ohtsuka et al. |
| 4,914,676 A | 4/1990 | Iwamatsu et al. |
| 4,992,798 A | 2/1991 | Nozue et al. |
| 5,023,620 A | 6/1991 | Matsuura |
| 5,068,667 A | 11/1991 | Mizoguchi |
| 5,075,697 A | 12/1991 | Koizumi et al. |

(Continued)

FOREIGN PATENT DOCUMENTS

EP    1365519    11/2003

(Continued)

OTHER PUBLICATIONS

Gagnon, et al., "A Simple and Fast Carrier Recovery Algorithm for High-Order QAM", IEEE Communications Letters, (9:10), Oct. 2005, pp. 918-920.

(Continued)

*Primary Examiner*—Shuwang Liu
*Assistant Examiner*—Kabir A Timory
(74) *Attorney, Agent, or Firm*—D. Kliger I.P. Services Ltd.

(57) ABSTRACT

A method for communication using a modulation scheme defined in a signal space includes determining demodulation confidence levels at a plurality of points distributed over the signal space. Weights are assigned to the respective points responsively to the demodulation confidence levels. A signal is received and demodulated using an adaptive loop so as to derive a corresponding signal point in the signal space. The adaptive loop is adjusted responsively to a weight assigned to the derived signal point.

44 Claims, 3 Drawing Sheets

U.S. PATENT DOCUMENTS

| | | | |
|---|---|---|---|
| 5,241,320 A | 8/1993 | Mizoguchi et al. | |
| 5,247,541 A | 9/1993 | Nakai | |
| 5,268,685 A | 12/1993 | Fujiwara | |
| 5,311,545 A | 5/1994 | Critchlow | |
| 5,311,546 A * | 5/1994 | Paik et al. | 375/232 |
| 5,313,467 A | 5/1994 | Varghese et al. | |
| 5,383,224 A | 1/1995 | Mizoguchi | |
| 5,406,589 A | 4/1995 | Iwamatsu et al. | |
| 5,432,522 A | 7/1995 | Kyrokami | |
| 5,471,508 A | 11/1995 | Koslov | |
| 5,495,502 A | 2/1996 | Andersen | |
| 5,524,027 A | 6/1996 | Huisken | |
| 5,541,951 A | 7/1996 | Juhasz et al. | |
| 5,541,955 A | 7/1996 | Jacobsmeyer | |
| 5,631,896 A | 5/1997 | Kawase et al. | |
| 5,710,799 A | 1/1998 | Kobayashi | |
| 5,727,032 A | 3/1998 | Jamal et al. | |
| 5,742,646 A | 4/1998 | Woolley et al. | |
| 5,809,070 A | 9/1998 | Krishnan et al. | |
| 5,838,740 A | 11/1998 | Kallman et al. | |
| 5,844,950 A | 12/1998 | Aono et al. | |
| 5,901,343 A | 5/1999 | Lange | |
| 5,905,574 A | 5/1999 | Vollbrecht et al. | |
| 5,920,595 A | 7/1999 | Iwamatsu | |
| 5,940,453 A | 8/1999 | Golden | |
| 5,987,060 A | 11/1999 | Grenon et al. | |
| 6,215,827 B1 | 4/2001 | Balachandran et al. | |
| 6,236,263 B1 | 5/2001 | Iwamatsu | |
| 6,252,912 B1 * | 6/2001 | Salinger | 375/278 |
| 6,262,994 B1 | 7/2001 | Dirschedl et al. | |
| 6,418,164 B1 | 7/2002 | Endres et al. | |
| 6,452,964 B1 | 9/2002 | Yoshida | |
| 6,466,562 B1 | 10/2002 | Yoshida et al. | |
| 6,501,953 B1 | 12/2002 | Braun et al. | |
| 6,611,942 B1 | 8/2003 | Battistello et al. | |
| 6,628,707 B2 | 9/2003 | Ratie et al. | |
| 6,647,059 B1 | 11/2003 | Faruque | |
| 6,665,810 B1 | 12/2003 | Sakai | |
| 6,678,259 B1 | 1/2004 | Schwengler | |
| 6,826,238 B2 | 11/2004 | Ahn et al. | |
| 6,829,298 B1 | 12/2004 | Abe et al. | |
| 6,836,515 B1 | 12/2004 | Kay et al. | |
| 6,888,794 B1 | 5/2005 | Jovanovic et al. | |
| 6,915,463 B2 | 7/2005 | Vieregge et al. | |
| 6,920,189 B1 | 7/2005 | Spalink et al. | |
| 6,954,504 B2 | 10/2005 | Tiedemann, Jr. et al. | |
| 7,003,042 B2 | 2/2006 | Morelos-Zaragoza et al. | |
| 7,016,296 B2 | 3/2006 | Hartman | |
| 7,046,753 B2 | 5/2006 | Resheff et al. | |
| 7,047,029 B1 | 5/2006 | Godwin et al. | |
| 7,133,425 B2 | 11/2006 | McClellan | |
| 7,133,441 B1 | 11/2006 | Barlev et al. | |
| 7,187,719 B2 | 3/2007 | Zhang | |
| 7,200,188 B2 | 4/2007 | Fague et al. | |
| 7,254,190 B2 | 8/2007 | Kwentus et al. | |
| 7,333,556 B2 | 2/2008 | Maltsev et al. | |
| 7,366,091 B1 | 4/2008 | Lahti et al. | |
| 7,418,240 B2 | 8/2008 | Hsu et al. | |
| 7,460,583 B2 | 12/2008 | Khayrallah et al. | |
| 7,463,867 B2 | 12/2008 | Luo et al. | |
| 7,492,701 B2 | 2/2009 | Song et al. | |
| 2001/0017897 A1 * | 8/2001 | Ahn | 375/261 |
| 2002/0016933 A1 | 2/2002 | Smith et al. | |
| 2002/0051498 A1 | 5/2002 | Thomas et al. | |
| 2002/0061752 A1 | 5/2002 | Kurokami | |
| 2002/0181490 A1 | 12/2002 | Frannhagen et al. | |
| 2003/0021370 A1 | 1/2003 | Menkhoff | |
| 2003/0043778 A1 | 3/2003 | Luschi et al. | |
| 2003/0066082 A1 | 4/2003 | Kliger et al. | |
| 2003/0135532 A1 | 7/2003 | Peting | |
| 2003/0203721 A1 | 10/2003 | Berezdivin et al. | |
| 2004/0017860 A1 | 1/2004 | Liu | |
| 2004/0063416 A1 | 4/2004 | Kuenen et al. | |
| 2004/0081081 A1 | 4/2004 | Colombo | |
| 2004/0086668 A1 | 5/2004 | Dronzek et al. | |
| 2004/0127179 A1 | 7/2004 | Sasaki | |
| 2004/0151108 A1 | 8/2004 | Blascoet et al. | |
| 2005/0002474 A1 | 1/2005 | Limberg | |
| 2005/0010853 A1 | 1/2005 | Duvant et al. | |
| 2005/0063496 A1 | 3/2005 | Guillouard et al. | |
| 2005/0075078 A1 | 4/2005 | Makinen et al. | |
| 2005/0169401 A1 | 8/2005 | Abraham et al. | |
| 2005/0190868 A1 | 9/2005 | Khandekar et al. | |
| 2005/0239398 A1 | 10/2005 | Lai | |
| 2005/0265436 A1 | 12/2005 | Suh et al. | |
| 2005/0286618 A1 | 12/2005 | Abe | |
| 2006/0008018 A1 | 1/2006 | Kolze | |
| 2006/0013181 A1 | 1/2006 | Stoplman et al. | |
| 2006/0056554 A1 * | 3/2006 | Lin et al. | 375/350 |
| 2006/0093058 A1 | 5/2006 | Skraparlis | |
| 2006/0107179 A1 | 5/2006 | Shen et al. | |
| 2006/0203943 A1 | 9/2006 | Scheim et al. | |
| 2006/0209939 A1 | 9/2006 | Mantha | |
| 2007/0076719 A1 | 4/2007 | Allan et al. | |
| 2007/0116143 A1 | 5/2007 | Bierke et al. | |
| 2007/0116162 A1 | 5/2007 | Eliaz et al. | |
| 2007/0133397 A1 | 6/2007 | Bianchi et al. | |
| 2007/0153726 A1 | 7/2007 | Bar-Sade et al. | |
| 2008/0002581 A1 | 1/2008 | Gorsetman et al. | |
| 2008/0008257 A1 | 1/2008 | Yonesi et al. | |
| 2008/0043829 A1 * | 2/2008 | Shiue et al. | 375/232 |
| 2008/0080634 A1 | 4/2008 | Kotecha et al. | |
| 2008/0130616 A1 | 6/2008 | Wengerter et al. | |
| 2008/0130726 A1 | 6/2008 | Sofer et al. | |
| 2008/0155373 A1 | 6/2008 | Friedman et al. | |
| 2008/0254749 A1 | 10/2008 | Ashkenazi et al. | |
| 2008/0259901 A1 | 10/2008 | Friedman et al. | |
| 2009/0022239 A1 | 1/2009 | Kimura et al. | |
| 2009/0049361 A1 | 2/2009 | Koren et al. | |
| 2009/0092208 A1 | 4/2009 | Montekyo et al. | |

FOREIGN PATENT DOCUMENTS

| | | |
|---|---|---|
| JP | 6021762 A | 1/1994 |
| JP | 9064791 A | 3/1997 |
| WO | 0060802 A1 | 10/2000 |
| WO | 0076114 A1 | 12/2000 |
| WO | WO 00/77952 | 12/2000 |
| WO | 2004086668 A1 | 10/2004 |
| WO | 2006097735 A2 | 9/2006 |
| WO | 2006118892 A1 | 11/2006 |
| WO | 2007040906 A2 | 4/2007 |

OTHER PUBLICATIONS

C. Richard Johnson, Jr., et al., "Blind Equalizatioin Using the Constant Modulus Criterion: A Review", Proceedings of the IEEE, vol. 86, No. 10, Oct. 1998.

Best, "Phase Locked Loops: Design, Simulation, And Applications",McGraw Hill, Fifth Edition, Jun. 2003.

Kim and Choi, Design of Carrier Recovery Algorithm for High -Order QAM with Large Frequency Acquisition Range.

Benany and Gagnon, "Comparison of Carrier Recovery Techniques in M-QAM Digital Communications", 13th Annuakl Canadian Conference on Electrical and Computer Engineering, Mar. 7-10, 2000, Halifax, Nova Scotia, pp. 73-77.

American National Standard T1.105-2001, "Synchronous optical network (SONET)—basic description including multiplex structure, rates and format", Alliance for Telecommunications Industry Solutions, 2001.

Calderbank A., "Multilevel Codes and Multistage Decoding", IEEE Transactions on Communications, vol. 37, No. 3 Mar. 1989.

Colavolpe et al., "Algorithms for iterative decoding in the presence of strong phase noise", IEEE Journal on Selected Areas in Communications, vol. 23, No. 9, pp. 1748-1757, Sep. 2005.

Goeckel D., "Adaptive Coding for Time-Varying Channels Using Outdated Fading Estimates", IEEE Transactions on Communications, vol. 47, No. 6, Jun. 1999.

Dr. Lin-Nan Lee, "LDPC Codes, Application to Next Generation Communication Systems", Hughes Network System Oct. 8, 2003.

Duel-Hallen et al., "Long Range Prediction of Fading Signals: Enabling Adaptive Transmission for Mobile Radio Channels" IEEE Signal Processing Magazine, vol. 17, No. 3, pp. 62-75, May 2000.

ITU Recommendation G.703 , "General Aspects of Digital Transmission Systems-Terminal Equipments-Physical/Electrical Characteristics of Hierarchical Digital Interfaces", Geneva, Switzerland 1991.

ITU Recommendation G.704, "Series G: Transmission Systems and Media, Digital Systems and Networks, Digital Transmission Systems-Terminal Equipments-General, Synchronous Frame Structures used at 1544, 6312, 2048, 8448 and 44736 kbit/s hierarchical levels", Oct. 1998.

Gallager R., "Low-Density Parity -Check Codes", IRE Transactions on Information Theory, vol. 7, pp. 21-28, Jan. 1962.

GR-253-CORE by Telcordia Technologies, "Synchronous optical network (SONET) transport systems: common criteria" Issue 3, Sep. 2000.

Hassan K., "LPDC encoded pilots for iterative receiver improvement", Thesis submiteed to the College Engineering of Wichita State University, Dec. 2005.

Ericsson AB, "Capacity without ties; Mini-Link microwave transmission solution", EN/LZT 712 0117 R2, Molndal, Sweden, 2005.

Hu et al., "Adaptive Modulation Using Long Range Prediction for Flat Rayleigh Fading Channels", Proceedings of the IEEE International Symposium on Information Theory, Sorrento, Italy, Jun. 25-30, 2000.

Niu et al., "Iterative Channel Estimation and LDPC Decoding over Flat Fading Channels: A Factor Graph Approach" 2003 Conference on Information Sciences and Systems, the Johns Hopkins University, Mar. 12-14, 2003.

Imai et al., "A New Multilevel Coding Method Using Error-Correcting Codes", IEEE Transactions on Information Theory, vol. IT-23, No. 3, 1977.

ITU Recommendation G.707/Y.1322, "Series G: Transmission systems and media, digital systems and networks, digital terminal equipments -general: Series Y: global information infrastructure and internet protocol aspects—transport; Network node interface for the syncronours digital hierarchy (SDH)", Oct. 2000.

ITU Recommendation G.783, "General Aspects of Digital Transmission Systems: Terminal Equipments—Characteristics of Syncronous Digital Hierarchy (SDH) Equipment Functional Blocks", Jan. 1994.

Sun J., "An Introduction to low Density Parity Check (LDPC) Codes", West Virginia University, Jun. 3, 2003.

Kim et al., "Design of Carrier Recovery Algorithm for High-Order QAM with Large Frequency Acquisition Range", IEEE Internatinal Conference on Communications (ICC), pp. 1016-1020, vol. 4, Helsinki, Finland, Jun. 11-14, 2001.

Kschischang F., "Capacity Approching Codes, Iterative Decoding Algorithms and Their Application: Codes defined on Graphs", IEEE Communications Magazine, pp. 118-125, Aug. 2003.

Mielczarek et al., "Improving phase estimation with enhanced turbo decoders", Nordic Radio Symposium 2001 (NRS01), Nynashamn, Sweden, Apr. 3-5, 2001.

Mielczarek et al., "Phase offset estimation using enhanced turbo decoders", Proceedings of the IEEE International Conference on Communications (ICC2002), vol. 3, pp. 1536-16460, New York, USA, Apr. 28-May 2, 2002.

Pottie et al., "Multilevel Codes based on Partitioning", IEEE Transactions on Information Theory, vol. 35, No. 1, pp. 87-98, Jan. 1989.

Richardson et al. , "An Introduction to the Analysis of Iterative Coding Systems", Proceedings of the 1999 Institute for Mathematics and its Applications (IMA) Summer Program: codes, systems and graphical models, Minneapolis, USA Aug. 2-6, 1999.

Richardson etr al., "Capacity Approaching codes; Iterative Decoding Algorithms and Their Application: The Renaissance of Gallager's Low-Densityy parity Check Codes", IEEE Communications Magazine, pp. 126-131, Aug. 2003.

Riegel M., "Requirements for edge-to edge estimation of time deivision multiplexed (TDM) circuits over packet switching networks", IETF Network Working Group, RFC 4197, Oct. 2005.

Ryan et al., "An introduction to LDPC Codes", GlobeCom 2003, San Francisco, USA, Dec. 5, 2003.

Saroka et al., "Joint Carrier Phase Estimation and Turbo Decoding Using Bit-Carrier-Phase APP Decoder", IEEE Transactions on Communications, 2004.

Satorius et al., "Adaptive modulation and coding techniques in MUOS fading/scintillation environments", Proceedings of the IEEE Military Communications Conference, Anaheim, USA, vol. 1, pp. 321-327, Oct. 7-10, 2002.

Standard T1.102-1993 of the ANSI, "American National Standard for Telecommunications-Digital Hierarchy-Electrical Interfaces", Dec. 1993.

Worthen et al., "Unified Design of Iterative Receivers Using Factor Graphs", IEEE Transactions on Information Theory, vol. 47, No. 2, pp. 843-849, Feb. 2001.

Jin et al., "Analysis of Joint Channel Estimation and LDPC Decoding on Block Fading Channels", International Symposium on Information Theory and its Applications, ISITA2004, Parma, Italy, Oct. 10-13, 2004.

U.S. Appl. No. 11/285,414 Official Acrtion dated Mar. 6, 2009.
U.S. Appl. No. 11/285,414 Official Action dated May 23, 2008.
U.S. Appl. No. 11/285,414 Official Action dated Nov. 12, 2008.
U.S. Appl. No. 11/479,050 Official Action dated Jul. 24, 2009.
U.S. Appl. No. 11/479,050 Official Action dated Mar. 4, 2009.
U.S. Appl. No. 11/483,078 Official Action dated Mar. 27, 2009.
U.S. Appl. No. 11/483,078 Official Action dated Jun. 2, 2008.
U.S. Appl. No. 11/483,078 Official Action dated Nov. 12, 2008.
International Application PCT/IL2006/001344 Search Report dated Mar. 13, 2008.
International Application PCT/IL2007/000326 Search Report dated Aug. 1, 2008.
International Application PCT/IL2007/000812 Search Report dated Jun. 4, 2008.
International Application PCT/IL2007/001410 Search Report dated Jan. 26, 2009.
International Application PCT/IL2008/001321 Search Report dated Feb. 19, 2009.
International Application PCT/IL2008/000453 Search Report dated Jun. 17, 2009.
Chinese Application No. 200580028811.1 Official Action dated Dec. 5, 2008.
European Application No. 08290290.9 Official Action dated Jun. 18, 2009.
European Application No. 08290290.9 Search Report dated Oct. 15, 2008.
Japanese Application No. 2007518808 Official Action dated Jan. 29, 2009.
Japanese Application No. 2007518808 Official Action dated Jun. 4, 2008.
U.S. Appl. No. 11/634,781 Official Action dated Sep. 21, 2009.
U.S. Appl. No. 11/645,828 Official Action dated Sep. 15, 2009.
U.S. Appl. No. 11/634,781 Official Action dated Mar. 2, 2010.
U.S. Appl. No. 11/787,059 Official Action dated Mar. 3, 2010.
U.S. Appl. No. 11/787,059 Official Action dated Jul. 9, 2010.

* cited by examiner

US 7,796,708 B2

ADAPTIVE RECEIVER LOOPS WITH WEIGHTED DECISION-DIRECTED ERROR

FIELD OF THE INVENTION

The present invention relates generally to communication systems, and particularly to methods and systems for decision-directed control of adaptive loops in a communication receiver.

BACKGROUND OF THE INVENTION

Several methods are known in the art for controlling adaptive loops in communication receivers. For example, U.S. Pat. No. 6,920,189, whose disclosure is incorporated herein by reference, describes a carrier recovery (CR) loop in which a frequency-sensitive phase error signal representative of the frequency offset between the receiver and the carrier of the received digital input signal is generated. The phase error signal is then used to reduce the frequency error with respect to the received digital input signal to enable locking of the receiver to the carrier of the digital signal.

Other exemplary carrier recovery methods are described by Gagnon et al., in "A Simple and Fast Carrier Recovery Algorithm for High-Order QAM," IEEE Communications Letters, (9:10), October 2005, pages 918-920, and by Kim and Choi in "Design of Carrier Recovery Algorithm for High-Order QAM with Large Frequency Acquisition Range," IEEE International Conference on Communication (ICC), Helsinki, Finland, Jun. 11-14, 2001, volume 4, pages 1016-1020, which are incorporated herein by reference.

Receiver loops sometimes use decision-directed methods in which receiver decisions, such as demodulated symbols, are used in controlling the loop. For example, decision feedback carrier recovery loops for coherent demodulation of 16-QAM signal formats are described by Benany and Gagnon in "Comparison of Carrier Recovery Techniques in M-QAM Digital Communication Systems," 13th Annual Canadian Conference on Electrical and Computer Engineering, Mar. 7-10, 2000, Halifax, Nova Scotia, pages 73-77, which is incorporated herein by reference.

In some methods and systems, weighting is applied to an error signal used for controlling the loop. For example, U.S. Pat. No. 6,826,238, whose disclosure is incorporated herein by reference, describes a quadrature amplitude modulation (QAM) receiver and carrier recovery method in which the frequency offset and phase jitter of a QAM signal are recovered using a weighted phase error inversely proportionate to the magnitude of the demodulated signal.

SUMMARY OF THE INVENTION

A well-known limitation of decision-directed loops is that the performance of the loop deteriorates significantly as the error probability of the receiver increases beyond a certain threshold. When the receiver makes erroneous symbol decisions, an error signal based on such decisions may cause the loop to be unstable, to unlock or to drift in the wrong direction.

In order to overcome this difficulty, embodiments of the present invention provide improved methods and systems for controlling adaptive receiver loops. In these embodiments, a receiver receives a signal transmitted to it using a certain modulation scheme defined in a certain signal space. The receiver demodulates the signal using an adaptive loop, such as a carrier recovery (CR) loop, an adaptive equalizer or an I/Q imbalance correction loop, so as to determine corresponding signal points in the signal space. In some embodiments, the receiver associates each signal point, using a slicer, for example, with a corresponding symbol in a symbol constellation defined by the modulation scheme.

In order to control the adaptive receiver loop, demodulation confidence levels are determined at different points over the signal space. The confidence level at a particular point in the signal space estimates the likelihood that a received symbol corresponding to this point will be demodulated correctly. The signal space points are then assigned weights responsively to the confidence levels. The assignment of weights to the signal space points may be performed by defining an error weighting function over the signal space. Alternatively, the signal space can be divided into a plurality of regions, with each region assigned a weight based on its respective confidence level.

When the receiver demodulates the received signal, the adaptive receiver loop is adjusted based on the weights assigned to the signal space points in which the received symbols fall. In some embodiments, the receiver produces an error signal responsively to the weights. The adaptive loop is then controlled using the error signal. Thus, received signals falling in areas of the signal space that correspond to low confidence levels can be prevented from distorting the error signal. Areas of the signal space having a high confidence level can be emphasized.

There is therefore provided, in accordance with an embodiment of the present invention, a method for communication using a modulation scheme defined in a signal space, the method including:

determining demodulation confidence levels at a plurality of points distributed over the signal space;

assigning respective weights to the points responsively to the demodulation confidence levels;

receiving and demodulating a signal using an adaptive loop so as to derive a corresponding signal point in the signal space; and adjusting the adaptive loop responsively to a weight assigned to the derived signal point.

In an embodiment, the modulation scheme defines a symbol constellation, demodulating the signal includes associating the derived signal point with a symbol in the constellation, and adjusting the adaptive loop includes producing an error signal responsively to the weight and the symbol in the constellation, and controlling the loop using the error signal. Producing the error signal may include applying the weight to an angular difference in the signal space between the signal point and the associated symbol in the constellation. Additionally or alternatively, producing the error signal further includes filtering the error signal using at least one of a linear filter and a non-linear filter.

In another embodiment, demodulating the signal includes deriving the corresponding signal point according to a division of the signal space into decision regions associated with respective symbols in the constellation, and determining the demodulation confidence levels and assigning the weights includes defining the confidence levels and the respective weights responsively to the division of the signal space into the decision regions.

In yet another embodiment, demodulating the signal includes deriving the corresponding signal point responsively to a division of the signal space into decision regions associated with respective symbols in the constellation, and the method includes adaptively modifying the division of the signal space into the decision regions responsively to the received and demodulated signal. In an embodiment, adaptively modifying the division of the signal space includes alternating between two or more predetermined divisions of the signal space into two or more sets of decision regions.

In another embodiment, adaptively modifying the division of the signal space includes modifying the decision regions responsively to at least one of previous values and subsequent values of the received and demodulated signal. In yet another embodiment, adaptively modifying the division of the signal space includes modifying the decision regions responsively to values of the received and demodulated signal corresponding to only a subset of the symbol constellation.

In still another embodiment, determining the demodulation confidence levels and assigning the weights includes dividing the signal space into a plurality of weight regions and assigning the respective weights to the weight regions, and adjusting the adaptive loop includes adjusting the loop responsively to the weight assigned to a weight region in which the signal point falls.

In an embodiment, the signal space includes an In-phase/Quadrature (I/Q) plane. In another embodiment, determining the demodulation confidence levels and assigning the weights includes adaptively modifying values of at least one of the demodulation confidence levels and the weights responsively the received and demodulated signal. Adaptively modifying the values of the at least one of the demodulation confidence levels and the weights may include modifying the values responsively to at least one of previous values and subsequent values of the received and demodulated signal.

In another embodiment, the modulation scheme defines a symbol constellation, demodulating the signal includes associating the derived signal point with a symbol in the constellation, and adaptively modifying the values of the at least one of the demodulation confidence levels and the weights includes modifying the values responsively to values of the received and demodulated signal corresponding to only a subset of the symbol constellation. In yet another embodiment, determining the demodulation confidence levels includes determining the demodulation confidence levels responsively to a level of at least one of a thermal noise, a phase noise and a signal distortion at the respective points in the signal space.

In an embodiment, adjusting the adaptive loop includes adjusting a phase of the received signal. In another embodiment, adjusting the adaptive loop includes adjusting a frequency of the received signal. In yet another embodiment, adjusting the adaptive loop includes adjusting a timing offset of the received signal. In still another embodiment, adjusting the adaptive loop includes adjusting a transfer function of the received signal. Additionally or alternatively, adjusting the adaptive loop includes correcting an In-phase/Quadrature (I/Q) imbalance in the received signal. Further additionally or alternatively, adjusting the adaptive loop includes adjusting a predistortion filter that filters the received signal.

In an embodiment, assigning the weights includes assigning a zero weight to points in the signal space having a low confidence level so as to omit signal points corresponding to the low confidence level from adjusting the adaptive loop. Adjusting the adaptive loop may include duplicating a previous signal point when omitting a signal point from adjusting the adaptive loop.

In another embodiment, adjusting the adaptive loop includes accessing a look-up table (LUT) holding the weights.

There is also provided, in accordance with an embodiment of the present invention, a receiver that uses a modulation scheme defined in a signal space, including:

an adaptive loop, which is arranged to adjust a property of a received signal responsively to a control signal;

a demodulator circuit, which is arranged to demodulate the received signal adjusted by the adaptive loop so as to determine a corresponding signal point in the signal space; and a loop control module, which is arranged to accept definitions of demodulation confidence levels determined at a plurality of points distributed over the signal space and of respective weights assigned to the points responsively to the demodulation confidence levels, and to adjust the adaptive loop based on a weight assigned to the signal point.

The present invention will be more fully understood from the following detailed description of the embodiments thereof, taken together with the drawings in which:

DETAILED DESCRIPTION OF EMBODIMENTS

Figure 1:
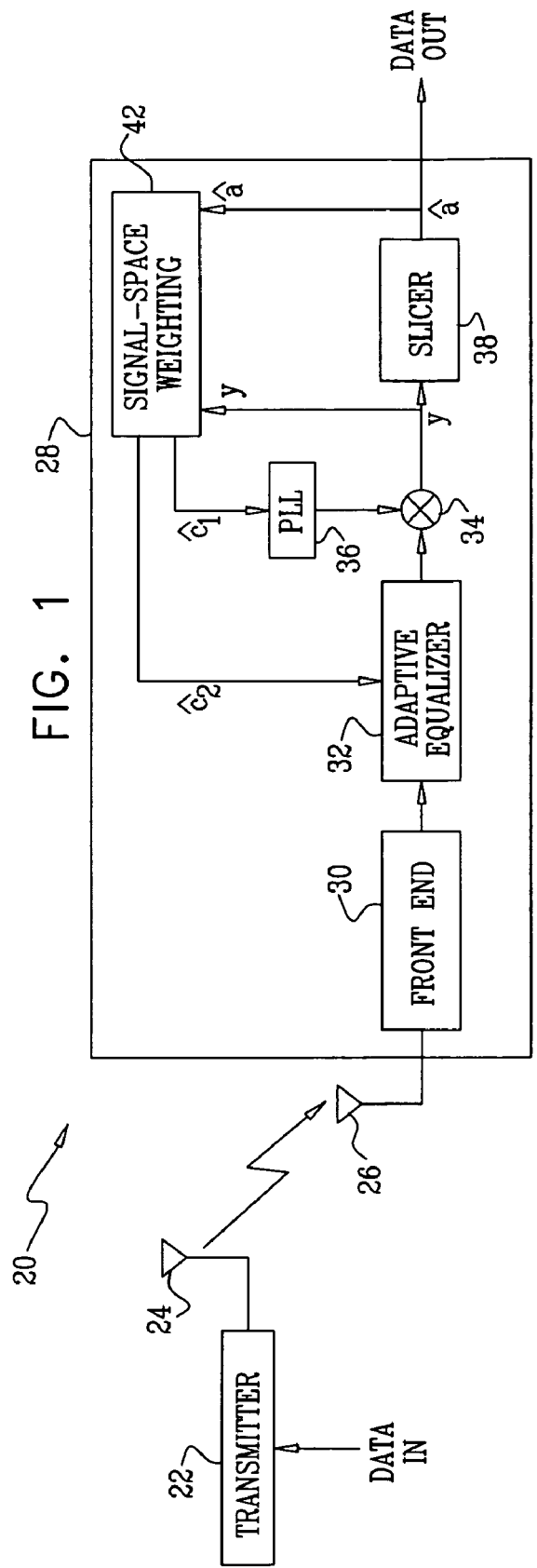
FIG. 1 is a block diagram that schematically illustrates a communication system, in accordance with an embodiment of the present invention.

FIG. 1 is a block diagram that schematically illustrates a communication system 20, in accordance with an embodiment of the present invention. Although FIG. 1 shows a wireless communication system, system 20 may comprise any wired or wireless system that uses adaptive loops in the receiver, such as microwave links, cellular systems, satellite systems and cable communication systems.

A transmitter 22 modulates input data onto a radio signal in accordance with a particular digital modulation scheme, such as phase shift keying (PSK) or quadrature amplitude modulation (QAM). The modulation operation comprises mapping the data to constellation symbols selected from a predetermined constellation, as is known in the art. In the description that follows, constellation symbols, as well as transmitted and received symbols, are represented graphically as two-dimensional coordinates in an In-phase/Quadrature (I/Q) plane. The two-dimensional I/Q plane is also commonly referred to as a signal space. Alternatively, the principles of the present invention that are described hereinbelow may also be adapted, mutatis mutandis, to modulation schemes and constellations whose signal space is one-dimensional or comprises three or more dimensions.

The transmitter transmits the radio signal using a transmit antenna 24. The signal is received by a receive antenna 26 and provided to a receiver 28. In the receiver, a front end (FE) 30 performs both analog and digital front end processing. FE 30 typically downconverts the signal to a suitable intermediate frequency (IF) or baseband signal, digitizes the signal using an analog to digital converter (AD) and performs additional digital processing functions such as automatic gain control (AGC), timing control and filtering.

Receiver 28 comprises one or more adaptive loops that adjust properties of the received signal so as to enable its reliable demodulation and decoding. Such adaptive loops may control and adjust the analog received signal, the digitized signal, or both. For example, an adaptive equalizer 32 is sometimes used to compensate for signal distortion caused by the transfer function of the communication channel between the transmitter and receiver. Additionally or alternatively, a carrier recovery (CR) loop is often used to compensate for phase and/or frequency offsets between the transmitter and receiver. In the example of FIG. 1, the carrier recovery loop is implemented using a phase locked loop (PLL) 36, which controls a phase rotator 34 so as to apply the desired phase correction to the received signal.

Other examples of adaptive receiver loops may comprise an automatic gain control (AGC) loop that adjusts the gain of the receiver, an I/Q imbalance correction loop that corrects orthogonality errors, scaling errors and/or DC offsets between the in-phase and quadrature signal components, as well as various timing and synchronization loops that adjust timing offsets at the receiver and set the sampling time of the ADC. The methods and systems described below provide improved decision-directed control of such adaptive loops.

A slicer circuit 38, also referred to as a demodulator circuit, accepts the received and adjusted signal (denoted y), and demodulates the signal in order to reconstruct the data. (The terminology used in the description that follows is that the received and adjusted signal y comprises a stream of received symbols. Each received symbol comprises a symbol transmitted by the transmitter, which has been subjected to noise and/or distortion by the transmitter, receiver and/or channel. The slicer demodulates the received signal by determining a demodulated symbol per each received symbol.)

In some embodiments, the slicer determines the two-dimensional signal space coordinate of each received symbol, and selects a respective constellation symbol having the minimum signal space distance to this coordinate. The selected constellation symbol (referred to as a demodulated symbol and denoted â) is assumed to estimate the transmitted symbol with high probability.

Figure 3:
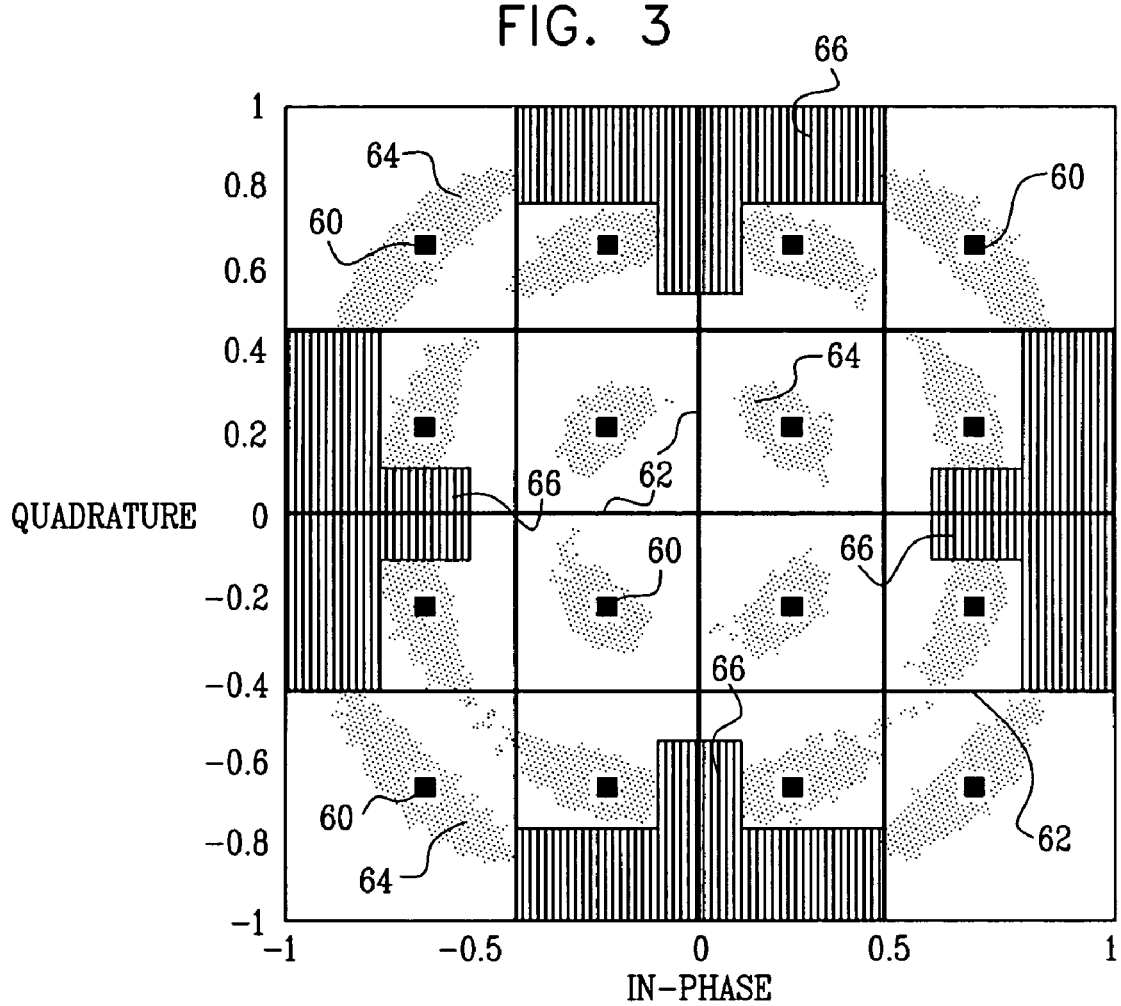
FIGS. 3 and 4 are signal space diagrams that schematically illustrate error weighting functions, in accordance with embodiments of the present invention.

Slicer 38 uses a predetermined geometrical arrangement of decision lines that divide the signal space into decision regions, each region surrounding one of the constellation symbols. When a received symbol falls inside a particular decision region, the demodulated symbol comprises the constellation symbol surrounded by this region. An exemplary arrangement of constellation symbols, decision lines and regions of a 16-QAM constellation is shown in FIG. 3 below.

Each adaptive loop in receiver 28 is controlled by an error signal, which is indicative of the desired correction, or adjustment, that should be applied by the loop. For example, the carrier recovery loop is controlled by providing an error signal denoted $\hat{c}_1$ to PLL 36. Signal $\hat{c}_1$ is indicative of the magnitude and direction of the desired phase correction. As another example, equalizer 32 is controlled by another error signal denoted $\hat{c}_2$, which is indicative of the magnitude and direction of the desired equalizer coefficient correction.

Error signals $\hat{c}_1$ and $\hat{c}_2$ are produced by a signal space weighting module 42, also referred to as a loop control module. For each symbol received by receiver 28, module 42 produces the error signals based on the received symbol y and on the demodulated symbol â. Since the error signals depend on the demodulated symbols â, the correction performed by module 42 is referred to as a decision-directed correction.

A well known limitation of decision-directed loops is that the correction performance of the loop deteriorates significantly as the error probability of the receiver increases beyond a certain threshold. In other words, when slicer 38 makes an erroneous symbol decision, the error signal depending on this decision often has a distorted value, often having an opposite direction with respect to the correct error signal. Attempting to control an adaptive loop with such a distorted error signal degrades the loop performance. In some cases, the distorted error signal may cause the loop to be unstable, to unlock or to drift in the wrong direction.

The error probability of slicer 38 depends on a number of factors, such as the signal to thermal noise ratio (SNR) and the amount of phase noise contained in the signal. The error probability may also be affected by other distortion sources, such as linear and non-linear hardware-related distortion of the signal and external interference. Such distortion may be caused, for example, by amplifier non-linearities in transmitter 22 and by I/Q imbalance or DC offsets in either transmitter 22 or receiver 28.

In many cases, the location of y in the I/Q plane indicates the level of noise and distortion likely to be present in a received symbol y. Put in another way, the likelihood of a particular received symbol y to cause an error in slicer 38 often depends on the signal space coordinate of the symbol. For example, a received symbol located adjacent to a decision line (i.e., a symbol having similar distances to two possible constellation symbols) has a relatively high likelihood of causing an error. As another example, when a conventional Cartesian slicer is used to demodulate a signal in the presence of strong phase noise, a received symbol having a large magnitude is more likely to cause an erroneous slicer decision. Thus, for a given slicer (i.e., a given constellation and a given geometry of decision regions) and a given scenario of thermal noise, phase noise and other distortion, the demodulation confidence level of a received symbol (i.e., the likelihood of the symbol to be correctly demodulated by slicer 38) depends on the signal space coordinate of the symbol. In some cases, as will be shown below, the confidence level may vary significantly across the signal space.

Signal space weighting module 42 takes into account the varying confidence level across the I/Q signal space when producing the error signals. In general, module 42 applies a weighting function denoted c(y), which is a function of y, the signal space coordinate of the received symbol. Using c(y), module 42 can give a higher weight to signal space coordinates having a higher confidence level, and vice versa.

In general, function c(y) is defined by determining demodulation confidence levels at various points or areas of the signal space, and assigning weights to these points responsively to the demodulation confidence levels. The weighting function may be continuously-varying or may take discrete values over the signal space.

In some embodiments, weights are assigned in discrete signal space regions. In these embodiments, c(y) is defined by dividing the I/Q plane into several regions, and assigning a respective weight to each region based on the confidence level of the region. In other words, the weight assigned to a region indicates the expected error probability of received symbols falling in this region. When a symbol y is received, module 42 determines the region in which the I/Q coordinate of the symbol falls and applies the corresponding weight to the error signal. In some embodiments, as will be shown below, areas of the signal space characterized by a very low confidence level are masked, and received symbols falling in these areas are omitted from the calculation of the error signals, i.e., c(y)=0. The function can also take into account additional parameters such as the identity of the demodulated symbol â and the resulting raw error ê, defined as ê=y−â. (By definition, both â and ê are derived from y given a particular slicer. From an implementation perspective, however, it is sometimes easier to define function c explicitly in terms of â and ê.)

In some embodiments, module 42 may produce the error signal by applying multiplicative weighting to the raw error signal ê, such that ĉ=ê·c(y)=(y−â)·c(y). In an alternative embodiment, typical of controlling a carrier recovery loop, PLL 36 is provided with an error signal indicative of the angular offset between y and â, i.e., the signal space angle between the received symbol and the corresponding demodulated symbol. In this embodiment, module 42 produces a correction signal given by $$\hat{c}_1 = \text{Im}\left\{\frac{y \cdot \hat{a}^*}{|\hat{a}|^2}\right\} \cdot c(y).$$

wherein $\text{Im}\{\cdot\}$ denotes the imaginary component and $(\cdot)^*$ denotes complex conjugation. For small angular offsets, the resulting error signal can be approximated as $\hat{c}_1 \cong \sin(y-\hat{a}) \cdot c(y) = \sin(\hat{e}) \cdot c(y)$. Further alternatively, module 42 may apply any other suitable weighting to produce the error signal.

Figure 2:
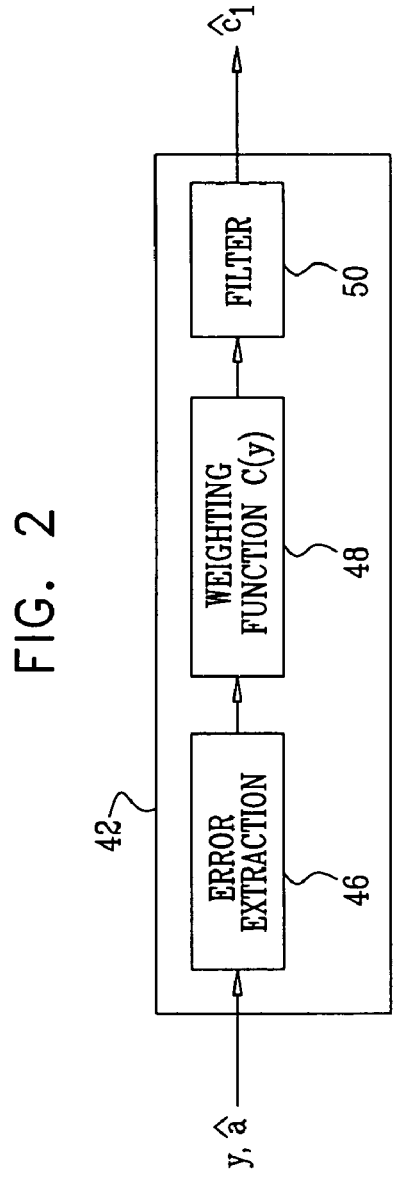
FIG. 2 is a block diagram that schematically illustrates a signal space weighting module, in accordance with an embodiment of the present invention.

FIG. 2 is a block diagram that schematically illustrates signal space weighting module 42 used for controlling a carrier recovery loop, in accordance with an embodiment of the present invention. In this embodiment, module 42 comprises an error extraction module 46, which accepts y and â and calculates a non-weighted error signal. A weighting module 48 then multiplies this signal by the appropriate weight c(y).

For example, in some embodiments the adaptive loop is controlled by an error signal based on the angular difference between the received symbols and the respective decoded constellation symbols. Such error signal is often used, for example, for controlling carrier recovery loops. In these embodiments, module 46 calculates the angle of the raw error signal ê, i.e., the angle of y−â. In alternative embodiments, error extraction module may calculate the raw error signal ê itself from y and â, or any other error calculation, as applicable.

It should be noted that although in some embodiments the non-weighted error signal produced by error extraction module 46 may depend on the angle (i.e., phase) of ê, the weights applied by module 48 may generally depend on either the phase of the error signal, its magnitude, or both. After weighting, a filter 50 may be used to smooth the error signal. The filter may comprise a linear filter, a non-linear filter or a combination of both. The filter may also comprise additional logic hardware for manipulating the error signal. Filter 50 can introduce a certain amount of history (i.e., dependence on previous symbols) and/or a dependence on subsequent symbols into the error signal.

FIG. 3 is a signal space diagram that schematically illustrates an exemplary error weighting function c(y), in accordance with an embodiment of the present invention. FIG. 3 shows sixteen constellation symbols 60 arranged in a 16-QAM constellation in the I/Q plane. Decision lines 62 divide the plane into sixteen decision regions, each region surrounding one of the constellation symbols.

Data points 64 show the signal space coordinates of multiple received symbols projected onto the I/Q plane. As can be seen, the data points are generally concentrated around the constellation symbols, but deviate from the constellation symbols due to thermal noise and phase noise. Typically, additive thermal noise causes the received symbols to be scattered in a two-dimensional circular Gaussian distribution around the constellation symbols. Phase noise, on the other hand, causes the received symbols to be scattered in a crescent-shaped distribution, in which there are mainly phase deviations and little magnitude deviation. FIG. 3 shows a combined effect in which both the thermal noise and phase noise are significant.

Low confidence regions 66 indicate areas of the I/Q plane that are particularly prone to errors. Received symbols whose I/Q coordinates fall in one of regions 66 are particularly likely to cause demodulation errors in slicer 38. As such, it is desirable to reduce the weight given by function c(y) to such received symbols when producing the error signals. In the present example, module 42 assigns a low weight to received symbols whose coordinates fall in regions 66, and a higher weight otherwise. In some embodiments, symbols falling into regions 66 are omitted altogether from the calculation of the error signal, i.e., c(y)=0.

The region arrangement of FIG. 3 is an exemplary arrangement, chosen for the sake of conceptual clarity. In alternative embodiments, the I/Q plane (i.e., the signal space) can be divided into any suitable number of regions having any suitable shapes and sizes. Although in the present example c(y) assigns only two different weights to the regions, any other suitable set of weight values can be used.

In some cases, c(y) is designed responsively to the expected noise distribution at slicer 38. For example, in situation characterized by low phase noise and dominant thermal noise, areas near the decision lines can be assigned lower weights. When phase noise is dominant, areas in the outer parts of the constellation are often more sensitive to phase errors and can be assigned a lower weight.

As noted above, some received symbols falling in low confidence regions may be omitted from the error signal calculation. In such cases, module 42 may repeat the previous error signal value in the present symbol interval in order not to force a zero value into the error signal. For this purpose, module 42 may filter the error signal using filter 50, in the present example comprising a non-linear filter. Alternatively, a median filter may be used. Further alternatively, a linear filter may be used to smooth the effect of an omitted value. Filter 50 may comprise a linear filter, a non-linear filter or a combination of liner and non-linear filters, possibly with additional logic functions.

FIG. 3 describes an embodiment in which the weights are assigned to discrete regions in the signal space. In general, however, function c(y) may comprise any suitable function defined over the signal space.

Figure 4:
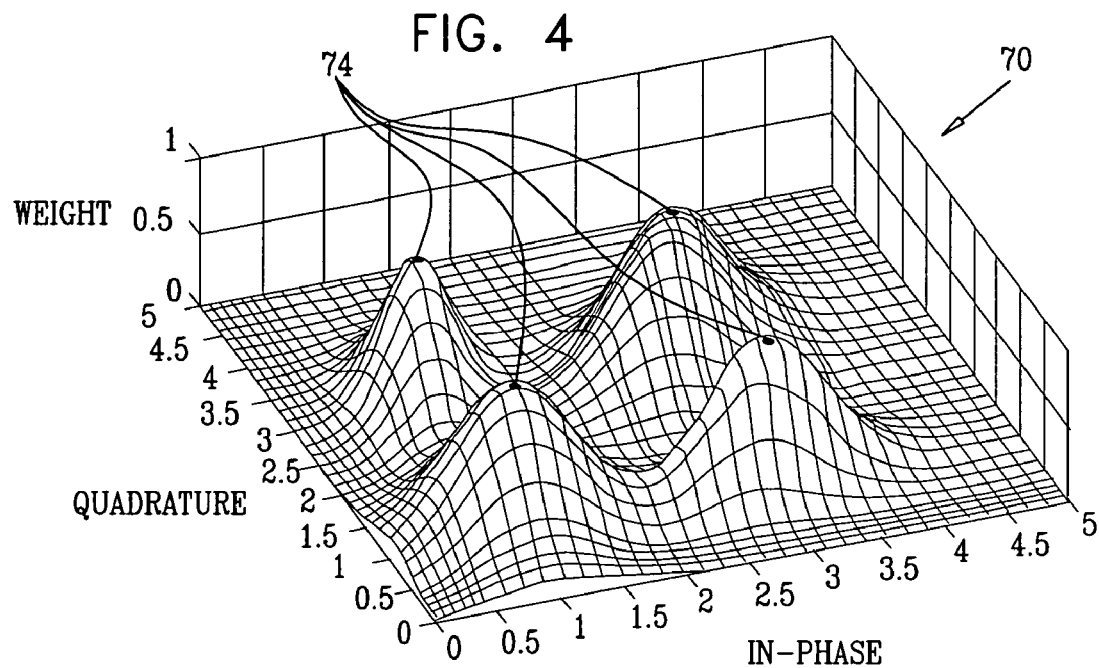

FIG. 4 is a signal space diagram that schematically illustrates an error weighting function, in accordance with another embodiment of the present invention. A surface 70 shows an exemplary error weighting function c(y) defined for a 16-QAM constellation, similar to the constellation of FIG. 3 above. For the sake of simplicity, only one of the four quadrants of the I/Q plane, containing four constellation symbols 74, is shown in the figure. The remaining three quadrants, with the remaining twelve constellation symbols, are symmetrical mirror images of the quadrant shown.

As can be seen in the figure, function c(y) defines a weight value in the range [0 . . . 1] for each coordinate in the I/Q plane (i.e., for each possible value of the received symbol y). I/Q coordinates near the constellation symbols are assigned higher weights. The weight values decrease for I/Q coordinates further away from the constellation symbols, gradually diminishing to zero.

Typically, the weighting function is designed responsively to the signal space distribution of the noise and distortion affecting the demodulation of the received signal. The function may take different values at the coordinates of different constellation symbols. The shape of the weighting function, and in particular the way in which the weight value decreases when moving away from the constellation symbols, may depend on factors such as the shape and size of the constellation, the thermal noise level or signal to noise ratio (SNR), the level of phase noise and its distribution and the level and distribution of any other linear or non-linear distortion.

As seen in the figure, the function does not necessarily have circular symmetry in the vicinity of the constellation symbols (i.e., the function may decrease more rapidly when moving away from a constellation symbol at a particular direction, and may decrease more gradually in another direction). The function may have a different shape in the vicinities of different constellation symbols.

The discrete error weighting function shown in FIG. 3 above can be viewed as an approximation of a continuous weighting function similar to the function of FIG. 4, albeit for different noise/distortion conditions. The function of FIG. 4 typically provides better performance at the expense of higher complexity.

In some embodiments, function c(y) can be implemented using a look-up table (LUT) that defines the signal space points and associated weights. The table can be indexed by I and Q coordinate values of the received symbols, as produced by slicer 38. In some embodiments, when the function is symmetrical, the table may hold only function values corresponding to part of the signal space, such as a single quadrant. Any suitable quantization can be used in the I and Q values used as indices to the table, such as using six bits for each coordinate. The weight values stored in the table can also be quantized to any suitable resolution, such as 2 or 4 bits. Alternatively, any other suitable hardware and/or software mechanism can be used to implement function c(y).

In some embodiments, confidence levels and weights can be determined and assigned adaptively, based on the received and demodulated symbols. For example, a particular area of the signal space may be initially assigned a relatively high confidence level, resulting in a relatively high weight value. If during operation it is found that received symbols falling in this area have a high error probability, the confidence level and/or weight assigned to this area can be adaptively reduced. Similarly, the confidence level and/or weights can be adaptively increased in areas of the signal space showing higher demodulation reliability than initially assumed. The adaptation of the confidence levels and/or weights may depend on previously received and/or subsequently received symbols. In some embodiments, the adaptation in a particular area of the signal space may depend on previous and/or subsequent values relating only to specific constellation symbols and not to the entire constellation.

In some embodiments, the structure of slicer 38 may be adapted, based on the received and demodulated symbols. The locations of decision lines and decision regions can be adapted during the operation of the receiver. For example, the receiver may begin operating with a slicer optimized for thermal noise. If, during operation, phase noise becomes the dominant noise in the receiver, certain areas of the signal space may cause a higher error rate than initially anticipated. The decision lines in these areas can be adaptively moved so that the resulting slicer becomes better suited for the currently present noise. Additionally or alternatively, the receiver may adaptively toggle or alternate between two or more predetermined slicer configurations, based on an analysis of the received and demodulated symbols. This adaptation can also depend on previous and/or subsequent symbols in the entire constellation or in selected constellation symbols.

Figure 5:
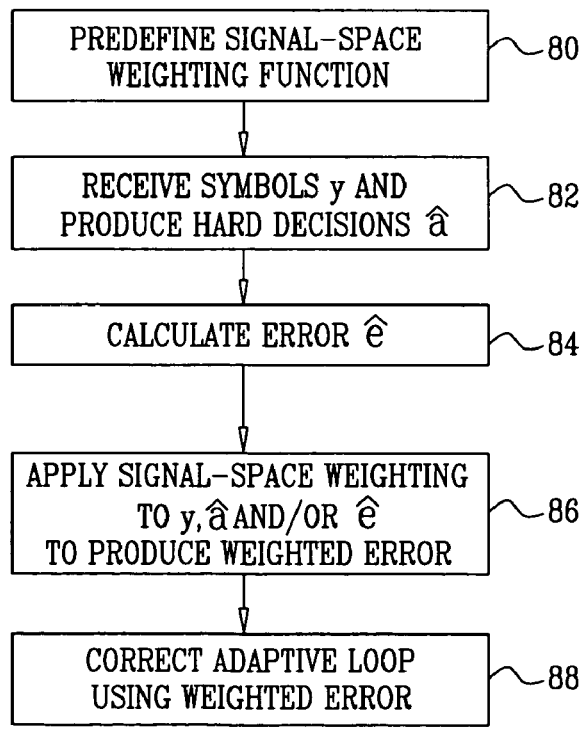
FIG. 5 is a flow chart that schematically illustrates a method for controlling an adaptive receiver loop, in accordance with an embodiment of the present invention.

FIG. 5 is a flow chart that schematically illustrates a method for controlling an adaptive receiver loop, in accordance with an embodiment of the present invention. The method begins by predefining weighting function c(y), at a weighting definition step 80. As noted above, the weights may be assigned either by defining an error weighting function over the I/Q plane (as shown in FIG. 4 above), or by dividing the I/Q plane into regions and assigning respective weights to the regions (as shown in FIG. 3 above).

Receiver 28 then receives a signal carrying received symbols y, at a reception step 82. Slicer 38 demodulates the received symbols to produce demodulated symbols â. The receiver then calculates the raw error ê, at a raw error calculation step 84. Signal-space weighting module 42 applies weighting function c(y) to the raw error signal so as to produce the error signal, at a weighting step 86. As described above, function c(y) assigns weights based on confidence levels assigned to the different I/Q coordinates. When discrete regions are used, received symbols falling in regions of low confidence level are prevented from distorting the error signal or given a lower weight, while symbols falling in high confidence level regions are given a higher weight. When a continuous error weighting function is used, the weights are assigned according to the weighting function value at the received symbol coordinate. The weighted error signal produced by module 42 is then used for controlling the adaptive receiver loop, at a loop adjustment step 88.

Although the embodiments described herein mainly refer to weighting error signal for controlling adaptive receiver loops, the methods and systems described herein can also be used in additional applications, such as controlling non-linear predistortion loops based on signal space coordinates of the received signal.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
assigning respective weights to a plurality of points distributed over a signal space;
at a first time, defining a first partitioning of the signal space into decision regions;
based on the first partitioning, receiving and demodulating a signal using a carrier recovery loop, which is controlled by a decision-directed error signal, so as to derive a corresponding signal point in the signal space;
setting at least one of an amplitude and a phase of the decision-directed error signal responsively to a respective one of the weights assigned to the derived signal point;
adjusting the carrier recovery loop using the error signal, responsively to a weight assigned to the derived signal point; and
at a second time subsequent to the first time, re-partitioning the signal space into the decision regions in accordance with a second partitioning, different from the first partitioning, and demodulating the signal based on the second partitioning.

2. The method according to claim 1, wherein demodulating the signal comprises associating the derived signal point with a symbol in a predefined symbol constellation, and wherein setting the at least one of the amplitude and the phase comprises producing the error signal responsively to the weight and the symbol in the constellation.

3. The method according to claim 2, wherein producing the error signal comprises applying the weight to an angular difference in the signal space between the signal point and the associated symbol in the constellation.

4. The method according to claim 2, wherein producing the error signal further comprises filtering the error signal using at least one of a linear filter and a non-linear filter.

5. The method according to claim 2, wherein demodulating the signal comprises deriving the corresponding signal point according to a division of the signal space into decision regions associated with respective symbols in the constellation, and wherein assigning the weights comprises defining the weights responsively to the division of the signal space into the decision regions.

6. The method according to claim 1, wherein re-partitioning the signal space comprises defining the decision regions in the second partitioning responsively to the received and demodulated signal.

7. The method according to claim 6, wherein re-partitioning the signal space comprises alternating between the first and second partitioning.

8. The method according to claim 6, wherein re-partitioning the signal space comprises defining the decision regions in the second partitioning responsively to at least one of previous values and subsequent values of the received and demodulated signal.

9. The method according to claim 8, wherein demodulating the signal comprises associating the derived signal point with a symbol in a predefined symbol constellation, and wherein re-partitioning the signal space comprises defining the decision regions in the second partitioning responsively to values of the received and demodulated signal corresponding to only a subset of the symbol constellation.

10. The method according to claim 1, wherein assigning the weights comprises dividing the signal space into a plurality of weight regions and assigning the respective weights to the weight regions, and wherein setting the at least one of the amplitude and the phase comprises setting the at least one of the amplitude and the phase responsively to the weight assigned to a weight region in which the derived signal point falls.

11. The method according to claim 1, wherein the signal space comprises an In-phase/Quadrature (I/Q) plane.

12. The method according to claim 1, wherein assigning the weights comprises adaptively modifying values of at least one of the weights responsively the received and demodulated signal.

13. The method according to claim 12, wherein adaptively modifying the values of the at least one of the weights comprises modifying the values responsively to at least one of previous values and subsequent values of the received and demodulated signal.

14. The method according to claim 13, wherein demodulating the signal comprises associating the derived signal point with a symbol in a predefined symbol constellation, and wherein adaptively modifying the values of the at least one of the weights comprises modifying the values responsively to values of the received and demodulated signal corresponding to only a subset of the symbol constellation.

15. The method according to claim 1, wherein adjusting the carrier recovery loop comprises adjusting a phase of the received signal.

16. The method according to claim 1, wherein adjusting the carrier recovery loop comprises adjusting a frequency of the received signal.

17. The method according to claim 1, wherein adjusting the carrier recovery loop comprises adjusting a timing offset of the received signal.

18. The method according to claim 1, wherein assigning the weights comprises assigning a zero weight to points in the signal space having a low confidence level so as to omit signal points corresponding to the low confidence level from adjusting the carrier recovery loop.

19. The method according to claim 18, wherein adjusting the carrier recovery loop comprises duplicating a previous signal point when omitting a signal point from adjusting the carrier recovery loop.

20. The method according to claim 1, wherein adjusting the carrier recovery loop comprises accessing a look-up table (LUT) holding the weights.

21. The method according to claim 1, wherein assigning the weights comprises determining demodulation confidence levels at the plurality of points, and assigning the weights to the respective points responsively to the demodulation confidence levels.

22. The method according to claim 21, wherein determining the demodulation confidence levels comprises determining the demodulation confidence levels responsively to a level of at least one of a thermal noise, a phase noise and a signal distortion at the respective points in the signal space.

23. A receiver, comprising:
a carrier recovery loop, which is controlled by a decision-directed error signal and is arranged to adjust a property of a received signal;
a demodulator circuit, which is arranged to demodulate the received signal adjusted by the carrier recovery loop so as to derive a corresponding signal point in a signal space at a first time based on a first partitioning of the signal space into decision regions, to re-partition the signal space into the decision regions at a second time subsequent to the first time in accordance with a second partitioning, different from the first partitioning, and to demodulate the signal at the second time based on the second partitioning; and
a loop control module, which is arranged to accept a definition of respective weights assigned to a plurality of signal points distributed over the signal space, to set at least one of an amplitude and a phase of the decision-directed error signal responsively to a respective one of the weights assigned to the derived signal point, and to adjust the carrier recovery loop using the error signal.

24. The receiver according to claim 23, wherein the demodulator circuit is arranged to associate the derived signal point with a symbol in a predefined symbol constellation, and wherein the loop control module is arranged to produce the error signal responsively to the weight and the symbol in the constellation.

25. The receiver according to claim 24, wherein the loop control module is arranged to apply the weight to an angular difference in the signal space between the derived signal point and the associated symbol in the constellation.

26. The receiver according to claim 24, wherein the loop control module is arranged to filter the error signal using at least one of a linear filter and a non-linear filter.

27. The receiver according to claim 23, wherein the definitions of the weights are based on the the decision regions in the first partitioning at the first time, and on the decision regions in the second partitioning at the second time.

28. The receiver according to claim 23, wherein the demodulator circuit is arranged to define the decision regions in the second partitioning responsively to the received and demodulated signal.

29. The receiver according to claim 28, wherein the demodulator circuit is arranged to alternate between the first and second partitioning.

30. The receiver according to claim 28, wherein the demodulator circuit is arranged to define the decision regions in the second partitioning responsively to at least one of previous values and subsequent values of the received and demodulated signal.

31. The receiver according to claim 30, wherein the demodulator circuit is arranged to associate the derived signal point with a symbol in a predefined symbol constellation, and to define the decision regions in the second partitioning responsively to values of the received and demodulated signal corresponding to only a subset of the symbol constellation.

32. The receiver according to claim 23, wherein the loop control module is arranged to accept definitions of a plurality of weight regions in the signal space and of a respective plurality of the weights that are assigned to the respective weight regions, and to set the at least one of the amplitude and the phase responsively to the weight assigned to a weight region in which the derived signal point falls.

33. The receiver according to claim 23, wherein the signal space comprises an In-phase/Quadrature (I/Q) plane.

34. The receiver according to claim 23, wherein the loop control module is arranged to adaptively modify values of at least one of the weights based on the received signal.

35. The receiver according to claim 34, wherein the loop control module is arranged to modify the values of the weights responsively to at least one of previous values and subsequent values of the received signal.

36. The receiver according to claim 35, wherein the demodulator circuit is arranged to associate the derived signal point with a symbol in a predefined symbol constellation, and wherein the loop control module is arranged to modify the values of the weights responsively to values of the received signal corresponding to only a subset of the symbol constellation.

37. The receiver according to claim 23, wherein the definitions of the weights assign a zero weight to points in the signal space having a low confidence level so as to omit signal points corresponding to the low confidence level from adjusting the carrier recovery loop.

38. The receiver according to claim 37, wherein the loop control module is arranged to duplicate a previous signal point when omitting a signal point from adjusting the carrier recovery loop.

39. The receiver according to claim 23, wherein the loop control module is arranged to access a look-up table (LUT) holding the weights so as to adjust the carrier recovery loop.

40. The receiver according to claim 23, wherein the loop control module is further arranged to accept demodulation confidence levels determined at the plurality of points, and to assign the weights to the respective points responsively to the demodulation confidence levels.

41. A method for communication, comprising:
assigning respective weights to a plurality of points distributed over a signal space;
at a first time, defining a first partitioning of the signal space into decision regions;
based on the first partitioning, receiving and demodulating a signal using an adaptive equalizer, which comprises equalizer coefficients that are controlled by a decision-directed error signal, so as to derive a corresponding signal point in the signal space;
setting at least one of an amplitude and a phase of the decision-directed error signal responsively to a respective one of the weights assigned to the derived signal point;
adjusting the equalizer coefficients using the error signal, responsively to a weight assigned to the derived signal point; and
at a second time subsequent to the first time, re-partitioning the signal space into the decision regions in accordance with a second partitioning, different from the first partitioning, and demodulating the signal based on the second partitioning.

42. A method for communication, comprising:
assigning respective weights to a plurality of points distributed over a signal space;
at a first time, defining a first partitioning of the signal space into decision regions;
based on the first partitioning, receiving and demodulating a signal using an In-phase/Quadrature (I/Q) imbalance correction loop, which is controlled by a decision-directed error signal, so as to derive a corresponding signal point in the signal space;
setting at least one of an amplitude and a phase of the decision-directed error signal responsively to a respective one of the weights assigned to the derived signal point;
adjusting an I/Q imbalance correction applied by the loop using the error signal, responsively to a weight assigned to the derived signal point; and
at a second time subsequent to the first time, re-partitioning the signal space into the decision regions in accordance with a second partitioning, different from the first partitioning, and demodulating the signal based on the second partitioning.

43. A receiver, comprising:
an adaptive equalizer, which comprises equalizer coefficients that are controlled by a decision-directed error signal and is arranged to filter a received signal;
a demodulator circuit, which is arranged to demodulate the received signal adjusted by the adaptive equalizer so as to derive a corresponding signal point in a signal space at a first time based on a first partitioning of the signal space into decision regions, to re-partition the signal space into the decision regions at a second time subsequent to the first time in accordance with a second partitioning, different from the first partitioning, and to demodulate the signal at the second time based on the second partitioning; and
a loop control module, which is arranged to accept a definition of respective weights assigned to a plurality of signal points distributed over the signal space, to set at least one of an amplitude and a phase of the decision-directed error signal responsively to a respective one of the weights assigned to the derived signal point, and to adjust the equalizer coefficients using the error signal.

44. A receiver, comprising:
an In-phase/Quadrature (I/Q) imbalance correction loop, which is controlled by a decision-directed error signal and is arranged to adjust a property of a received signal;
a demodulator circuit, which is arranged to demodulate the received signal adjusted by the I/Q imbalance correction loop so as to derive a corresponding signal point in a signal space at a first time based on a first partitioning of the signal space into decision regions, to re-partition the signal space into the decision regions at a second time subsequent to the first time in accordance with a second partitioning, different from the first partitioning, and to demodulate the signal at the second time based on the second partitioning; and
a loop control module, which is arranged to accept a definition of respective weights assigned to a plurality of signal points distributed over the signal space, to set at least one of an amplitude and a phase of the decision-directed error signal responsively to a respective one of the weights assigned to the derived signal point, and to adjust an I/Q imbalance correction applied by the loop using the error signal.

* * * * *